(12) United States Patent
Fromm et al.

(10) Patent No.: US 7,830,883 B1  
(45) Date of Patent: Nov. 9, 2010

(54) MODIFYING DUPLICATE PACKETS TO HAVE DIFFERENT TRANSPORT FORMATS

(75) Inventors: Kelly Donald Fromm, Newman Lake, WA (US); Keith Michael Bly, Newman Lake, WA (US)

(73) Assignee: World Wide Packets, Inc., Spokane Valley, WA (US)

(*) Notice: Subject to any disclaimer, the term of this patent is extended or adjusted under 35 U.S.C. 154(b) by 468 days.

(21) Appl. No.: 11/612,905

(22) Filed: Dec. 19, 2006

(51) Int. Cl. *H04L 12/28* (2006.01)

(52) U.S. Cl. .......................... 370/392; 726/5

(58) Field of Classification Search ................ 370/392, 370/386; 726/5  
See application file for complete search history.

(56) References Cited

U.S. PATENT DOCUMENTS

| | | | |
|---|---|---|---|
| 5,526,349 A | 6/1996 | Diaz et al. | |
| 5,550,803 A | 8/1996 | Crayford et al. | |
| 5,648,960 A | 7/1997 | Sakazaki et al. | |
| 6,233,224 B1 | 5/2001 | Yamashita et al. | |
| 6,724,781 B1* | 4/2004 | Dupont | 370/535 |
| 6,765,924 B1 | 7/2004 | Wu et al. | |
| 6,798,775 B1 | 9/2004 | Bordonaro et al. | |
| 7,020,149 B1 | 3/2006 | Hellwig et al. | |
| 7,068,654 B1* | 6/2006 | Joseph et al. | 370/392 |
| 7,133,423 B1 | 11/2006 | Chow et al. | |
| 7,218,648 B1 | 5/2007 | Jackson | |
| 7,346,682 B2 | 3/2008 | Basani et al. | |
| 2003/0012149 A1* | 1/2003 | Maggenti et al. | 370/260 |
| 2003/0051024 A1 | 3/2003 | Garnett et al. | |
| 2003/0174647 A1 | 9/2003 | Gutierrez et al. | |
| 2003/0206548 A1 | 11/2003 | Bannai et al. | |
| 2004/0066781 A1 | 4/2004 | Shankar et al. | |
| 2004/0151198 A1 | 8/2004 | Brown et al. | |
| 2005/0025156 A1* | 2/2005 | Smathers | 370/395.5 |
| 2005/0041695 A1 | 2/2005 | Bordogna et al. | |
| 2005/0141417 A1 | 6/2005 | Huang et al. | |
| 2005/0195845 A1 | 9/2005 | Mayhew et al. | |
| 2005/0220143 A1 | 10/2005 | DelRegno et al. | |
| 2005/0271033 A1 | 12/2005 | Nakash | |
| 2005/0286541 A1 | 12/2005 | Bottorff et al. | |
| 2006/0007939 A1 | 1/2006 | Elangovan | |
| 2006/0039374 A1 | 2/2006 | Belz et al. | |
| 2006/0130126 A1* | 6/2006 | Touve et al. | 726/5 |
| 2006/0153179 A1* | 7/2006 | Ho et al. | 370/386 |
| 2006/0185002 A1 | 8/2006 | Bachmutsky et al. | |

OTHER PUBLICATIONS

"Layer 2 Virtual Private Networks (L2VPN)," *World Wide Packets*, 10 pages. (Undated).

"Provider Backbone of Carrier Ethernet Services—White Paper", Rev. 1.0, *World Wide Packets*, 9 pages (undated).

(Continued)

*Primary Examiner*—Dang T Ton  
*Assistant Examiner*—Wei Zhao  
(74) *Attorney, Agent, or Firm*—Clements Bernard PLLC; Christopher L. Bernard; Tyler S. Brown (57) ABSTRACT

This invention includes methods and packet switches that modify duplicate packets to have different transport formats. A packet switch receives a plurality of duplicate packets from a switching fabric and modifies two or more of the duplicate packets so that the modified duplicate packets have different transport identifiers. The packet switch then transmits one of the duplicate packets on each of a plurality of ports of the packet switch.

10 Claims, 7 Drawing Sheets

OTHER PUBLICATIONS

"MPLS/VPLS Evolution: A Riverstone Perspective", *Riverstone Networks Whitepapers*, 11 pages (© 2006).
"Adding Scale, QoS and Operational Simplicity to Ethernet, White Paper/Provider Backbone Transport," Nortel, 8 pages (© 2006).
Whitters, J., et al., "VPLS Technical Tutorial: Technical Introduction to Multipoint Ethernet Services over MPLS/Technology White Paper," *ALCATEL*, 8 Pages (Undated).
Heinanen, et al., "A Single Rate Three Color Marker" Network Marketing Group; Univ of PA Sep. 1999 (6 pp.).
Heinanen, et al., "A Two Rate Three Color Marker" Network Maketing Group; Univ of PA Sep. 1999 (5 pp.).
U.S. Appl. No. 11/421,763, filed Jun. 1, 2006; inventor: Daines et al.
U.S. Appl. No. 11/421,764, filed Jun. 1, 2006; inventor: Daines et al.
U.S. Appl. No. 11/421,766, filed Jun. 2, 2006; inventor: Daines, et al.
U.S. Appl. No. 11/612,914, filed Dec. 19, 2006; inventor: Fromm et al.

\* cited by examiner

MODIFYING DUPLICATE PACKETS TO HAVE DIFFERENT TRANSPORT FORMATS

TECHNICAL FIELD

The present invention, in various embodiments, relates to methods and packet switches configured to modify duplicate packets to have different transport formats.

BACKGROUND OF THE INVENTION

Some packet networks include a packet switch that receives a packet having one transport identifier, such as a Virtual Local Area Network (VLAN) identifier, on one port and transmits a modified version of the packet having a different transport identifier, such as a Multiprotocol Label Switching (MPLS) label, on another port. Such packet switches modify the packet to have the different transport identifier prior to forwarding the packet through a switching fabric to a destination port of the packet switch.

This approach to modifying the packet may be slow, resource intensive, or both because the packet switch must select the transport identifier to be added to the packet at the ingress port of the packet switch. Typically, this involves not only determining which port of the packet switch the packet will be forwarded to, but also referencing a large lookup table that includes all of the transport identifiers that could potentially be added to the packet to determine which of the potential transport identifiers is to be added to the packet. Managing the large lookup table may require significant system resources, especially during failover operations in which the entire table may need to be transferred to a different hardware module.

Modifying the packet to have the different transport identifier at the ingress port may also unnecessarily consume switching fabric bandwidth associated with the packet switch. If the new transport identifier is lengthy, the switch may consume a significant amount of the switching fabric bandwidth in relaying packets that have been modified to include the different identifier.

These speed, resource, and bandwidth issues associated with conventional packet switches are particularly evident when conventional packet switches relay multicast packets and/or broadcast packets addressed to a plurality of destination ports.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
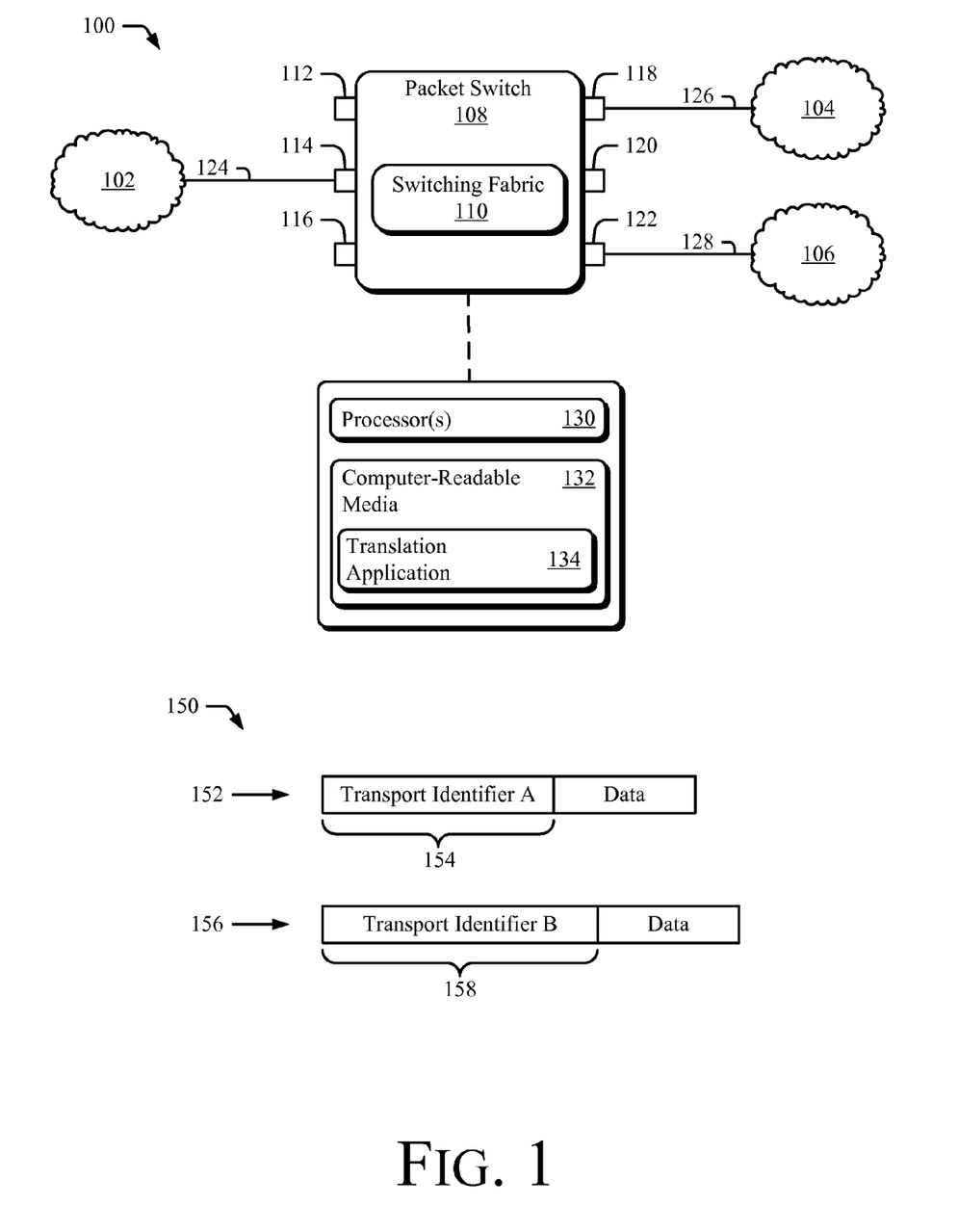
FIG. 1 illustrates a block diagram of a packet switch in an exemplary operating environment along with exemplary packet formats.

FIG. 1 illustrates an exemplary operating environment generally at 100 in which a packet switch configured to translate between a switching format and a transport format operates. The environment 100 comprises three networks 102, 104, and 106 connected to each other via a packet switch 108 and three links 124, 126, and 128. The packet switch includes a switching fabric 110 as well as six ports 112, 114, 116, 118, 120, and 122.

Link 124 connects network 102 to the packet switch via port 114. Similarly, link 126 connects network 104 to the packet switch via port 118 and link 128 connects network 106 to the packet switch via port 122. Ports 112, 116, and 120 may be connected to other networks or packet switches that are not illustrated for simplicity.

Networks 102, 104, and 106 may classify packets according to a transport identifier portion of the packets. The transport identifier identifies a packet as being associated with a particular data stream or with a particular service. Devices within network 102, 104, and/or 106 may rely on the transport identifier being present in the packets to make forwarding decisions.

The transport identifier may comprise many different forms such as one or more VLAN identifiers, an MPLS label, an MPLS label stack, a provider bridging (PB) identifier, a provider backbone bridging (PBB) identifier, a provider backbone transport (PBT) identifier, a Virtual Private LAN Service (VPLS) identifier, and other forms of identifiers known to those of skill in the art. For example, the transport identifier may be a PBT identifier having a value associated with a layer two virtual private network connecting two geographically disparate locations.

In the exemplary operating environment of FIG. 1, networks 102, 104, and 106 each classify packets using a different transport identifiers. For example, network 102 may use VLAN identifiers, network 104 may use a PBT identifier, and network 106 may use a VPLS identifier.

Packet switch 108 enables networks 102, 104, and 106 to exchange packets with each other despite the fact that networks 102, 104, and 106 use different transport identifiers. For example, packet switch 108 may facilitate forwarding packets having "VLAN 100" as a transport identifier from network 102 to network 104 by translating the "VLAN 100" transport identifier to a PBT identifier. In translating to a PBT identifier, packet switch 108 may leave the "VLAN 100" transport identifier intact and add additional fields to the packet so that the packet complies with a PBT format. For example, packet switch 108 may add backbone destination and source address fields, a backbone VLAN identifier, an instance identifier, and a service VLAN identifier to the packet.

Similarly, packet switch 108 may facilitate forwarding packets having "VLAN 100" as a transport identifier from network 102 to network 106 by translating the "VLAN 100" transport identifier to a VPLS identifier.

In enabling two networks to exchange packets, a packet switch may translate the format of a packet received from one of the networks (a source network) from a source-network transport format to a switching format understood by the packet switch. The packet switch may then forward the packet to a destination port based on the switching format. Next, the packet switch may translate the format of the packet from the switching format to a destination-network transport format before transmitting the packet out of the destination port to the destination network. In this manner, the packet switch translates between a switching format and a transport format.

According to one aspect of the invention, a packet switch receives a packet on one of its ports that is addressed to a device downstream from a second port of the packet switch. The device downstream from the second port may be connected directly to the second port or may be connected indirectly to the second port via one or more other packet switching devices. The packet includes a transport identifier. After forwarding the packet through a switching fabric, the packet switch modifies the packet so that the packet includes a different transport identifier and transmits the modified packet out of the second port to the device.

In modifying the packet so that it includes the different transport identifier, the packet switch may replace the original transport identifier with the different transport identifier. Alternatively, the packet switch may add the different transport identifier to the packet and edit the transport identifier, or add the different transport identifier without altering the original transport identifier. One way of adding the different transport identifier is to "push" the different transport identifier onto the packet. Another way to add the identifier is to insert the identifier at a particular location within the packet.

The original transport identifier and the different transport identifier need not have the same format and need not be the same length. For example, packet switch 108 of FIG. 1 may receive a packet having a VLAN identifier as a first transport identifier from network 102 on port 114 of packet switch 108 that is addressed to a device that is part of network 104. Packet switch 108 forwards the packet through the switching fabric and then modifies the packet so that it has the different transport identifier before forwarding the packet to port 118. The different transport identifier may be a PBT identifier that is much longer than the VLAN identifier of the original transport identifier. Packet switch 108 then transmits the modified packet having the different transport identifier to network 104 on link 126.

The packet switch may remove the original transport identifier from the packet prior to forwarding the packet through the switching fabric. Removing the original transport identifier may advantageously reduce the amount of bandwidth consumed by the switching fabric in forwarding the packet.

FIG. 1 also illustrates a set 150 of exemplary data packets associated with an exemplary packet flow from network 102 to network 104. Exemplary data packet 152 is an Ethernet packet addressed to a device that is part of network 104 that includes transport identifier A and data. Of course, the packet may include other fields as well. Here, for simplicity, the exemplary data packets depict only the transport identifier and the data. Network 102 sends this packet to packet switch 108 on link 124.

Packet switch 108 forwards exemplary data packet 152 through switching fabric 110. Before forwarding exemplary packet 152 to network 104, packet switch 108 modifies the packet to have a different transport identifier. Exemplary data packet 156 illustrates the format of exemplary packet 152 after packet switch 108 has modified exemplary packet 152 to have a different transport identifier.

Exemplary data packet 156 has the same data as exemplary data packet 152. However, exemplary data packet 156 has a different transport identifier, in this case transport identifier B. Transport identifier A and transport identifier B may have different formats. For example, transport identifier A may include one or more VLAN identifiers and transport identifier B may include one or more MPLS labels. Transport identifier A and transport identifier B may have other differences. For example, transport identifier A may be a first number of bits 154 long and transport identifier B may be a second number of bits 158 long.

Packet switch 108 may comprise a translation application that translates packets from a switching format to a transport format and translates packets from a transport format to a switching format. The translation application may be implemented in a number of ways.

For example, in some embodiments packet switch 108 may comprise one or more processor(s) 130 and computer-readable media 132. The computer-readable media includes a translation application 134 comprising a set of executable instructions that, when executed, translate packets from a switching format to a transport format and may also translate packets from a transport format to a switching format. The processor(s) are capable of accessing and/or executing the computer-readable media.

Alternatively, translation application 134 may be implemented in one or more programmable logic devices, such as a Field Programmable Gate Array (FPGA). In this embodiment, the FPGA is configured for accessing and/or executing the computer-readable media, including translation application 134. In yet another alternative embodiment, the functionality of translation application 134 may be implemented in one or more hardware devices, such as an application specific integrated circuit, within packet switch 108.

Figure 2:
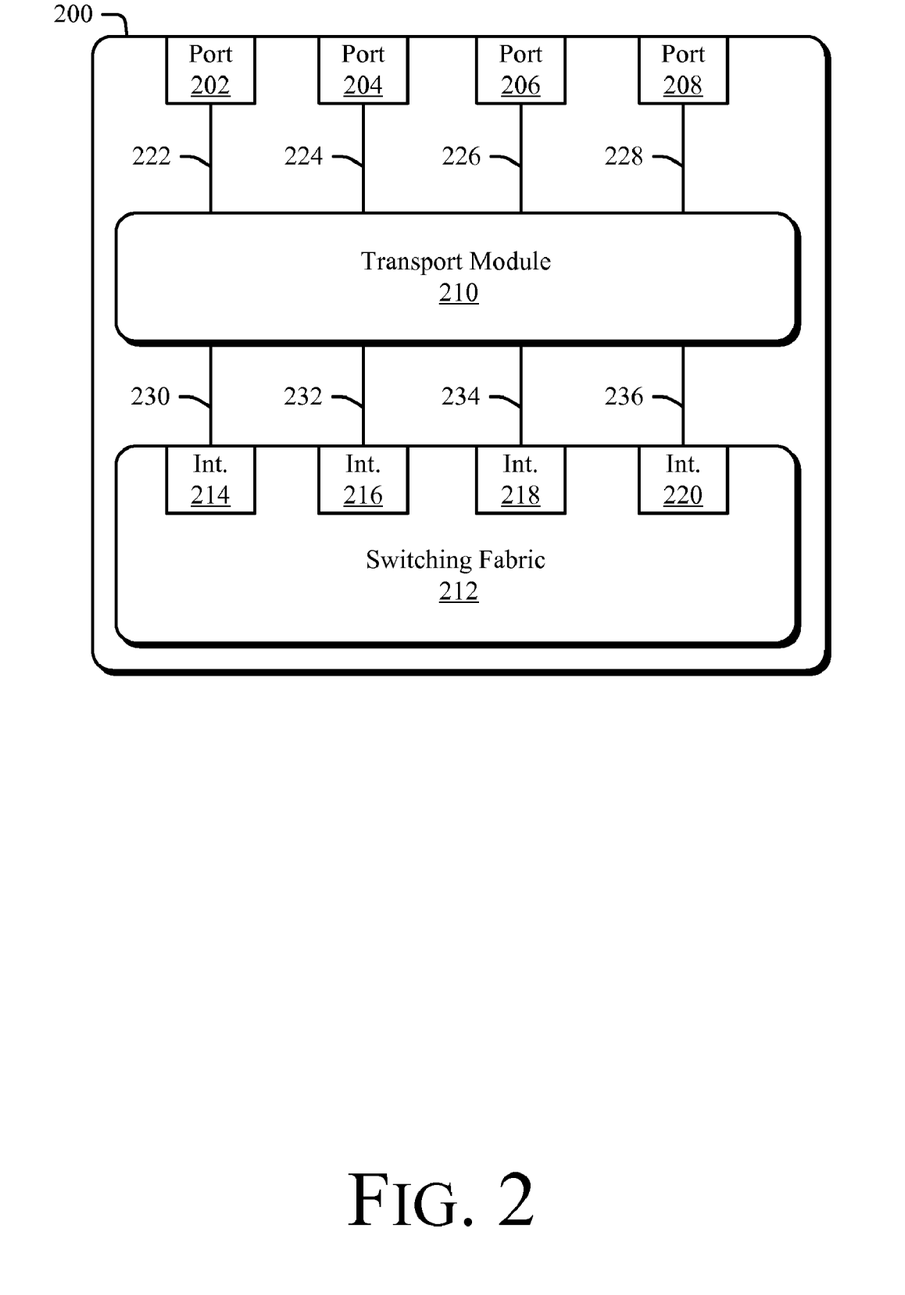
FIG. 2 is a block diagram of a packet switch according to one embodiment of the invention.

FIG. 2 illustrates a packet switch 200. Packet switch 200 may be used as packet switch 108 of FIG. 1. Packet switch 200 includes four ports 202, 204, 206, and 208. It also includes a transport module 210 and a switching fabric 212. Switching fabric 212 includes four interfaces, 214, 216, 218, and 220, each of which is associated with one of the four ports. Links 222, 224, 226, and 228 connect the ports to transport module 210 and links 230, 232, 234, and 236 connect transport module 210 to the interfaces of switching fabric 212.

The transport module translates packets from a switching format to a transport format and may also translate packets from a transport format to a switching format. Although FIG. 2 illustrates a single transport module, the functionality of the transport module may be embodied in a number of ways. For example, two or more transport modules may be used in a way such that each of the transport modules is associated with a subset of the ports and each of the ports are associated with one of the transport modules.

In an alternative embodiment of the transport module, each port of the packet switch may be associated with a distinct transport module. Alternatively, a subset of the ports of the packet switch may each be associated with a distinct transport module and another subset of the ports might not be associated with a transport module. In yet another embodiment of the transport module, the transport module implements the functionality of the translation application described above in relation to FIG. 1. Of course, there are additional alternative ways of implementing the transport module well known to those of skill in the art.

The transport module may be placed in-line between the ports and the switching fabric as is illustrated in FIG. 2. In this configuration, transport module 210 receives packets from a port on a link, processes the packets, and then forwards the packets to switching fabric 212 on another link. Similarly, transport module 210 receives packets that are intended to be transmitted on a port from switching fabric 212, processes the packets, and the forwards the packets to the port on another link.

For example, link 222 connects port 202 to transport module 210 and link 230 connects transport module 210 to switching fabric 212. Packet switch 200 utilizes links 222 and 230 to relay packets associated with port 202 and might not use these links to relay packets associated with other ports of packet switch 200. The other ports of packet switch 200 have a similar pair of links that enable packet switch 200 to relay packets between switching fabric 212, transport module 210, and the port.

According to one aspect of the invention, the transport module does not forward data packets received from one port to another port. Instead, the transport module forwards packets it receives from the ports to the switching fabric. Likewise, the transport module forwards packets it receives from the switching fabric to the ports.

The switching fabric is able to forward data packets received on a switching fabric interface to another switching fabric interface. The interfaces of the switching fabric are associated with the ports of the packet switch. When the transport module sends a packet to an interface of the switching fabric, the transport module may inform the switching fabric as to which of the switching fabric interfaces the switching fabric must forward the packet. In response, the switching fabric receives the packet and forwards the packet to the interface specified by the transport module. The switching fabric may be implemented using a single semiconductor device or it may be implemented using a plurality of semiconductor devices.

Packet switch 200, illustrated in FIG. 2 as a block diagram, may be implemented in a number of ways. For example, packet switch 200 may be a chassis-based device to which a plurality of blades or modules may be added. The blades may include ports, portions of the switching fabric, control circuitry, and the like. According to one implementation of packet switch 200, one port, on which a packet is received, may be located on one of the blades and a destination port, to which the packet is forwarded may be located on a different one of the blades.

Furthermore, the switching fabric may be split between blades so that a portion of the switching fabric may be located on one blade and another portion of the switching fabric may be located on a different blade.

According to one aspect of the invention, a method of operating a packet switch includes a packet switch receiving a packet on a port. The packet may include a first transport identifier. Next, the packet switch assigns the packet to a virtual switch based on the port on which the packet was received.

For example, the packet switch may assign all packets received on a port to a same virtual switch. When the received packet does include a first transport identifier, the packet switch may assign the received packet to a virtual switch based on the port on which the packet was received and on the first transport identifier.

When the received packet does not include a transport identifier, the packet switch may assign the received packet to a virtual switch based on the port on which the packet was received. The packet switch may additionally base the assignment to a virtual switch on the fact that the received packet does not include a first transport identifier.

The packet switch forwards the packet through the switching fabric to a destination interface of the switching fabric that is associated with the virtual switch. The transport module receives the packet from the destination interface and then modifies the packet so that the packet includes a second transport identifier. Next, the transport module forwards the modified packet to a destination port of the packet switch associated with the destination interface.

The packet switch may be packet switch 200. For example, packet switch 200 may receive an Ethernet packet on port 202. This Ethernet packet may include a first transport identifier, for example, a VLAN identifier. The Ethernet packet may also include a destination address addressing the Ethernet packet to a device (not illustrated) connected directly or indirectly to port 206 of packet switch 200. The transport module receives the Ethernet packet via link 222 and assigns the Ethernet packet to a virtual switch based on the fact that the Ethernet packet was received on port 202 and based on the first transport identifier.

Transport module 210 then forwards the Ethernet packet to interface 214 of switching fabric 212 on link 230. Transport module 210 also determines that the Ethernet packet is to be forwarded to port 206, based on the Ethernet packet's destination address, and instructs switching fabric 212 to forward the Ethernet packet to port 206. Switching fabric 212 then forwards the Ethernet packet to a destination interface, interface 218, which is associated with port 206.

Switching fabric 212 sends the Ethernet packet to transport module 210 on link 234. Transport module 210 then modifies the Ethernet packet by removing the VLAN identifier (the first transport identifier) and adding a second transport identifier (such as a VPLS identifier) to the Ethernet packet. Transport module 210 then forwards the modified Ethernet packet to port 206 on link 226. Of course, transport module 210 may also leave the VLAN identifier in place and add the second transport identifier (such as a PBB identifier) to the packet so that the modified packet includes both the VLAN identifier and the second transport identifier.

The packet switch, in assigning the packet to a virtual switch, may add a header to the packet prior to forwarding the packet to the destination interface of the switching fabric. The header may include a virtual switch identifier associated with the assigned virtual switch. The header may also include the destination port to which the packet is to be forwarded. In fact, a header including the destination port may be the mechanism by which the transport module informs the switching fabric of the destination port to which the packet is to be forwarded.

If the transport module receives a packet containing a header from the switching fabric after the switching fabric has forwarded the packet, the transport module may remove the header from the packet prior to forwarding the packet to a destination port.

Alternatively, the transport module may create metadata associated with the packet that includes the virtual switch identifier and the destination port. The metadata may be forwarded to the switching fabric along with the packet instead of being included as part of the packet.

The packet switch may remove the first transport identifier from the packet prior to forwarding the packet through the switching fabric. Removing the first transport identifier may reduce the amount of switching fabric bandwidth consumed by the switching fabric in forwarding the packet to a destination interface by reducing the size of the packet.

The packet switch uses the virtual switch to segregate packets associated with one virtual switch from packets associated with a different virtual switch. The virtual switch is configured to forward packets associated with the virtual switch to at least one of the ports associated with the virtual switch. The virtual switch is also configured to preclude packets associated with the virtual switch from being forwarded to a port of the packet switch that is not associated with the virtual switch.

A virtual switch may have an associated virtual switch identifier. The virtual switch identifier may be added to packets that are associated with the virtual switch, for example in a header as described above. This enables the packets to be easily identified as being associated with the virtual switch. Alternatively, as was described above, the virtual switch identifier may be added to metadata associated with the packet. The packet switch may accommodate a plurality of virtual switches. Each virtual switch may be associated with a subset of the ports of the packet switch, and each of the ports of the packet switch may be associated with one or more virtual switches.

Figure 3:
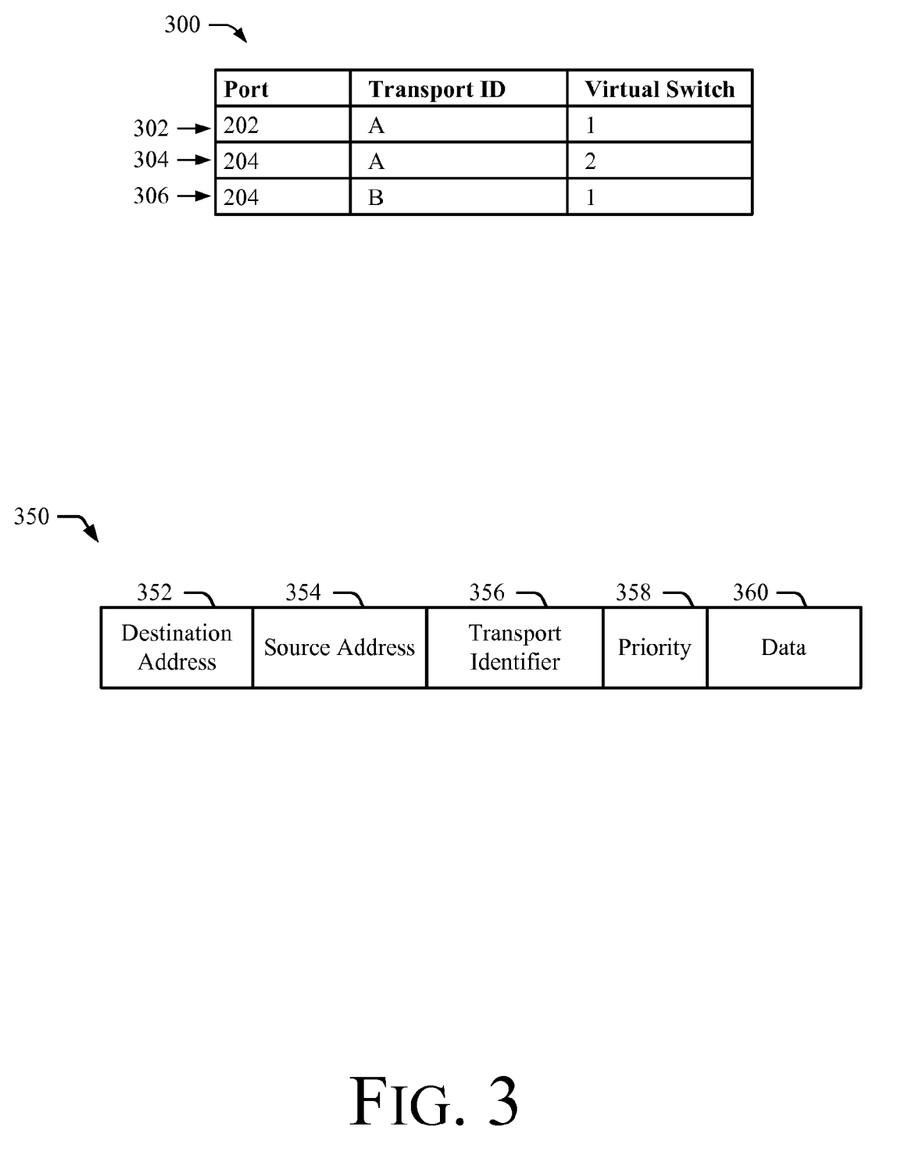
FIG. 3 illustrates an exemplary table and an exemplary data packet associated with the packet switch of FIG. 2.

In assigning a packet to a virtual switch, the transport module may use a mapping between the port the packet was received on, the first transport identifier, and a virtual switch. FIG. 3 illustrates a table 300 containing an exemplary mapping used in assigning a packet to a virtual switch. The table includes a port column, a transport identifier column, and a virtual switch column.

Row 302 of table 300 illustrates a configuration in which packets received on port 202 that have transport identifier A are assigned to virtual switch 1. Similarly, row 304 illustrates that packets received on port 204 having transport identifier A are assigned to virtual switch 2. This result differs from conventional packet switches in which packets having the same transport identifier are assigned to the same virtual switch.

Row 306 of table 302 illustrates that packets received on port 204 that have transport identifier B are to be assigned to virtual switch 1 along with packets received on port 202 having transport identifier A. This result also differs from conventional packet switches in which packets assigned to the same virtual switch have the same transport identifier.

Of course, other fields of the packet may also be used in mapping a packet to a virtual switch. For example, assigning a packet to a virtual switch may involve assigning based on the port the packet was received on, the first transport identifier, and at least one additional field of the packet.

FIG. 3 illustrates a sample packet 350 having fields that may be used in assigning a packet to a virtual switch. Sample packet 350 includes a destination address 352, source address 354, transport identifier 356, priority 358, and data 360. Of course, the sample packet may also include other fields that are not illustrated for simplicity.

The transport module may use a mapping between the port the packet is received on, the transport identifier 356, and the destination address 352 in assigning the packet to a virtual switch. This mapping groups packets having the same destination address and same transport identifier together in a single virtual switch. This grouping may be used to provide a particular quality of service to packets assigned to the virtual switch as they are forwarded through the packet switch that may be different from the quality of service experienced by packets assigned to other virtual switches.

In other embodiments, the transport module may use fields such as a layer-two source address, layer-two destination address, layer-three source address, layer-three destination address, layer-four port, and priority value in mapping packets to a virtual switch.

According to one aspect of the invention, the packet switch parses a packet it receives from an ingress port into one or more packet identifiers. The packet identifiers are adapted to influencing a forwarding decision. The forwarding decision is the decision the packet switch makes in deciding to which port a received packet should be forwarded.

The packet switch maps the packet to one of a plurality of virtual switches based on the ingress port and a first subset of the packet identifiers. The virtual switch to which the packet is mapped is associated with a plurality of ports. The packet switch adds a virtual switch identifier associated with the virtual switch to which the packet is mapped.

The packet identifiers may be the fields described above in relation to sample data packet 350. Optionally, the packet switch may use the transport identifier as the first subset of packet identifiers. Of course, additional or other identifiers may also be included in the first subset of identifiers. For example, the first subset of identifiers may include the transport identifier, the destination address, and the layer-four port fields of the packet.

Once the packet has been mapped to a virtual switch, the packet switch uses the second subset of packet identifiers to forward the packet to a destination port. Optionally, the second subset of packet identifiers may include the destination address of the packet. The first subset of packet identifiers and the second subset of packet identifiers may overlap, that is, they may both include one or more of the same packet identifiers.

The packet switch may use a mapping between the second subset of packet identifiers and the ports associated with the virtual switch in making the forwarding decision. Note that the forwarding decision may be based on the virtual switch and second subset of identifiers, and not on any transport identifier present in the packet. The transport identifier is used to map the packet to a virtual switch, but thereafter it might not be used to make the forwarding decision. In this way, the forwarding decision, or switching behavior, is based on the virtual switch and not on the transport aspect of the packet.

If the packet switch receives a packet having a second subset of packet identifiers (e.g., a destination address) that are not associated with any of the ports of the virtual switch to which the packet is mapped, the packet switch forwards the packet to all of the ports of the virtual switch to which the packet is mapped. This behavior may be referred to as "flooding" the packet.

In contrast, if the packet switch receives a packet having a second subset of packet identifiers (e.g., a destination address) that are associated with one or more the ports of the virtual switch to which the packet is mapped, the packet switch forwards the packet to the one or more associated ports of the virtual switch. For example, if the second subset of packet identifiers is the destination address of the packet, and the packet switch has a stored association between the destination address of the received packet and one of the ports associated with the virtual switch, the packet switch forwards the packet to the port associated with the destination address.

The transport module may use the destination address as the second subset of packet identifiers. The transport module may determine if any of the ports of the mapped virtual switch are associated with the destination address of a received packet by consulting a table such as the exemplary table 400 of FIG. 4.

Figure 4:
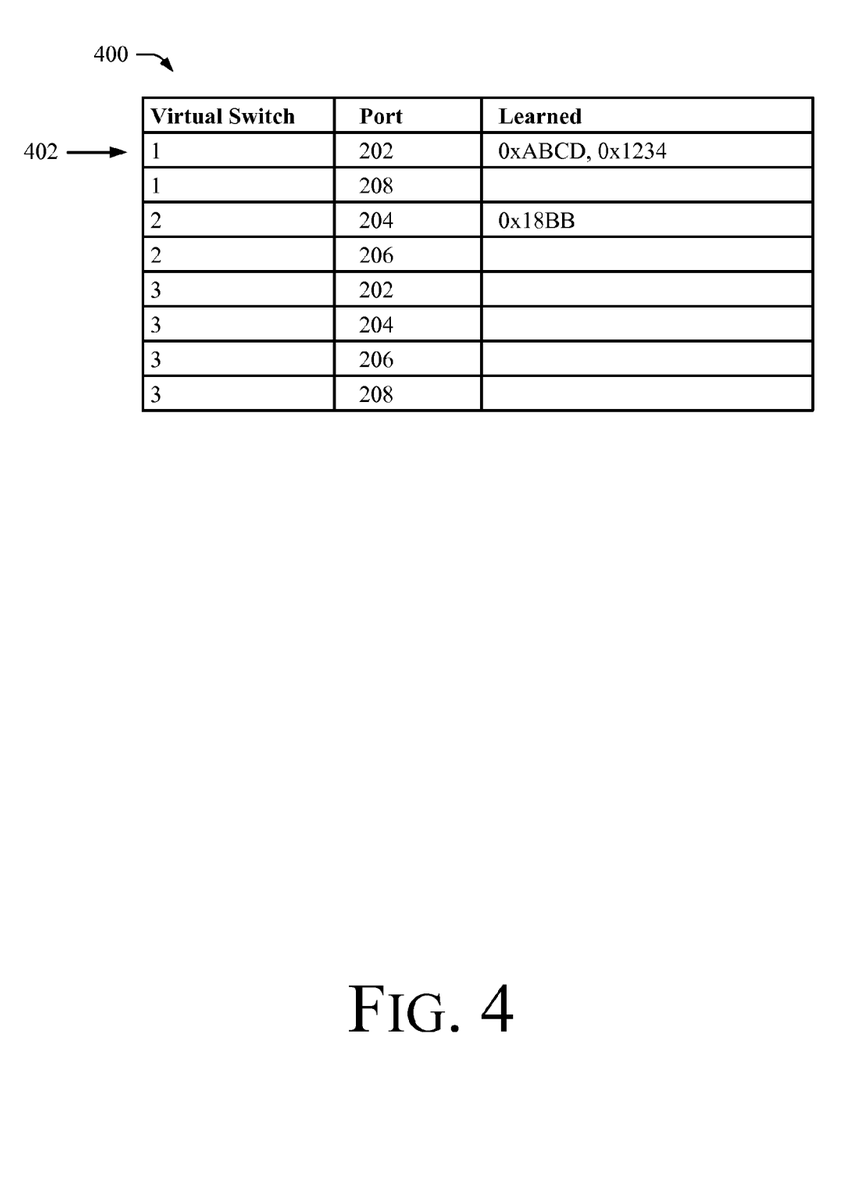
FIG. 4 illustrates an exemplary table used by the packet switch of FIG. 2 to forward data packets.

Table 400 illustrates destination addresses that are associated with a virtual switch and a port. For example, according to row 402 of the table, destination address 0xACED is associated with port 202 and virtual switch 1. Accordingly, if the transport module receives a packet that is mapped to virtual switch 1 and has a destination address of 0xACED, the transport module will forward the packet to port 202 rather than flooding the packet to all of the ports associated with virtual switch 1.

The transport module may utilize conventional learning behavior, well understood by those of skill in the art, to populate the table with destination addresses as the destination addresses are learned.

The second sent subset of identifiers may include identifiers in addition to or instead of the destination address. For example, the second subset of identifiers may be the transport identifier and the transport module may forward data packets based on their transport identifiers rather than on their destination addresses.

This method of forwarding advantageously reduces the size of the table described above since the transport module need not learn all of the destination addresses of the packets that it receives. Instead, the transport module associates transport identifiers with ports. This method is feasible when the packet switch forwards all packets received on a port having the same transport identifier (e.g. PBT identifier or VPLS identifier) to a single port of the packet switch.

Once the transport module has identified the destination port(s) for a packet, the transport module may forward the packet to the switching fabric along with an instruction to forward the packet to the identified destination port(s). The instruction may comprise adding the destination port to a header and adding a header to the packet.

Alternatively, the destination port may be noted in metadata associated with the packet that is forwarded to the switching fabric along with the packet. In response, the switching fabric forwards the packet to the switching fabric interface associated with the identified port and the transport module subsequently receives the packet from the interface.

According to another aspect of the invention, once the packet has been transmitted from a switching fabric interface associated with a destination port, the transport module receives the packet and determines, based on the destination port, a treatment to be applied to the packet. The transport module then applies the treatment to the packet and forwards the packet to the destination port.

The treatment may include adding a transport identifier to the packet, editing an existing transport identifier, removing an existing transport identifier, adding a transport identifier without altering an existing transport identifier and/or adding a transport identifier and editing an existing transport identifier.

Editing the existing transport identifier may include modifying a priority value of the packet, changing a type field of the packet, or other packet modification well known to those of skill in the art. Removing an existing transport identifier may include removing all existing transport identifiers so that the packet no longer includes a transport identifier.

If the packet is an Ethernet packet, editing the existing transport identifier may include modifying a priority value, changing a VLAN value, changing the Ethertype field, and the like. Removing the existing transport identifier may include removing any transport identifiers present in the packet so that the resulting modified packet does not have a transport identifier.

The packet the transport module receives from the switching fabric may be associated with a virtual switch and may include a virtual switch identifier. In this case, the transport module may determine the treatment to be applied to the packet based on the associated virtual switch and the destination port. For example, each port may be associated with a plurality of treatments, one for each of the virtual switches associated with the port. Accordingly, packets associated with a first virtual switch that egress a particular port may have a first treatment applied and packets associated with a second virtual switch that egress the same port may have a second treatment applied.

One aspect of the determined treatment may be removing the virtual switch identifier from the packet prior to forwarding the packet to the destination port. Removing the virtual switch identifier advantageously prevents devices external to the packet switch from detecting the virtual switch identifier.

Figure 5:
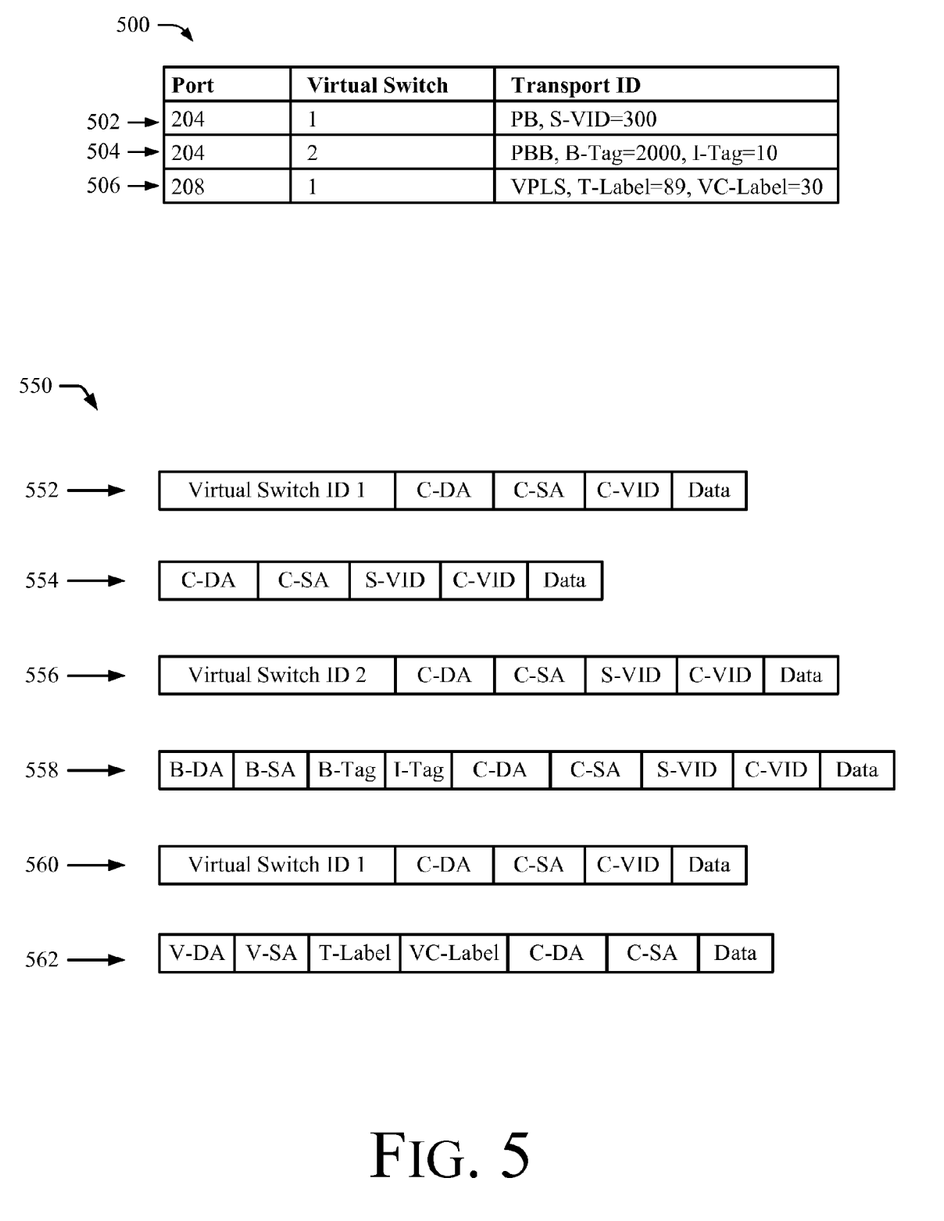
FIG. 5 illustrates an exemplary table used by the packet switch of FIG. 2 in translating between a switching format and a transport format, as well as exemplary data packets.

Table 500 of FIG. 5 illustrates an exemplary mapping used by transport module 210 to determine a treatment for the packet. In this example, the treatment applied by transport module 210 includes removing a virtual switch identifier from the packet and adding a transport identifier to the packet.

According to row 502 of table 500, packets received by transport module 210 that are destined for port 204 and are associated with virtual switch 1 receive a PB identifier with a service VLAN identifier of 300. Similarly, row 504 specifies that packets destined for port 204 and associated with virtual switch 2 receive a PBB identifier with a backbone tag having a value of 2000 and an instance tag having a value of 10. Thus, a single port, port 204, may transmit packets associated with virtual switch 1 having a PB identifier and packets associated with virtual switch 2 having a PBB identifier.

Since transport module 210 does not require that the PB identifier and the PBB identifier have a similar format, length, or value, port 204 may transmit packets having very different transport identifiers.

Row 506 of table 500 specifies that packets destined for port 208 and associated with virtual switch 1 receive a VPLS identifier having a tunnel label value of 89 and a virtual connection label value of 30. Note that unlike conventional packet switches, packets associated with virtual switch 1 may have one of two different treatments, depending on the port on which they are transmitted. If a packet associated with virtual switch 1 is transmitted on port 204, it will have a PB identifier, but if a packet associated with virtual switch 1 is transmitted on port 208, it will have a VPLS identifier.

Transport module 210 makes these different treatments possible. Having different treatments for different ports may greatly reduce network equipment expense. For example, a network operator may need to support connections to two different networks, each having a different transport identifier. Without the transport module, the network operator may have to use two different packet switches, one supporting each of the two transport identifiers, in order to connect to the two networks. Using the transport module enables the network operator to use a single packet switch rather than two different packet switches, greatly reducing both capital expense and operating expense.

FIG. 5 also illustrates six exemplary data packets 550. Exemplary data packet 552 represents an Ethernet packet forwarded by switching fabric 212 to transport module 210 on link 232. This packet includes virtual switch identifier 1 (for example as part of a header), a customer destination address (C-DA), a customer source address (C-SA), a customer VLAN identifier (C-VID), and data. Transport module 210 uses the virtual switch identifier, and the fact that the packet was received on link 232 (which is associated with port 204) to determine, based on table 500, that the PB identifier is to be added to the packet.

Accordingly, transport module 210 modifies the packet. Exemplary packet 554 depicts the modified version of the packet. Transport module 210 removes the virtual switch identifier from the packet and adds a PB identifier to the packet. In the depicted exemplary packet, the PB identifier includes a service VLAN identifier (S-VID). Of course, the PB identifier may also include other fields that, for simplicity, are not illustrated. Transport module 210, in this case, modifies exemplary packet 552 by inserting the PB identifier between the customer source address and customer VLAN identifier fields.

The PB identifier may be a PB identifier conforming to the Institute of Electrical and Electronics Engineers (IEEE) 802.1ad standard. Transport module 210 transmits this packet on link 224 to port 204.

Exemplary data packet 556 represents another packet forwarded by switching fabric 212 to the transport module on link 232. This packet includes virtual switch identifier 2, a customer destination address, a customer source address, a service VLAN identifier, a customer VLAN identifier, and data. Transport module 210 uses the virtual switch identifier, and the fact that the packet was received on link 232 (which is associated with port 204) to determine, based on table 500, that the PBB identifier is to be added to the packet.

Accordingly, transport module 210 modifies the packet to remove the virtual switch identifier and add the PBB identifier. Exemplary packet 558 depicts the modified version of the packet. In the depicted exemplary packet, the PBB identifier includes a backbone source address (B-SA), a backbone destination address (B-DA), a backbone tag (B-Tag), and an instance tag (I-Tag). Transport module 210, in this case, modifies exemplary packet 556 by appending the PBB identifier to the front of the packet.

Of course, the PBB identifier may also include other fields that, for simplicity, are not illustrated. The PBB identifier may be a PBB identifier conforming to the IEEE 802.1ah standard. Transport module 210 transmits this packet on link 224 to port 204.

Exemplary data packet 560 represents a packet forwarded by switching fabric 212 to transport module 210 on link 236. This packet includes virtual switch identifier 1 and a customer destination address, a customer source address, a customer VLAN identifier, and data. Transport module 210 uses the virtual switch identifier, and the fact that the packet was received on link 236 (which is associated with port 208) to determine, based on table 502, that the VPLS identifier is to be added to the packet.

Accordingly, transport module 210 modifies the packet to remove the virtual switch identifier and add the VPLS identifier. In the depicted exemplary packet, the VPLS identifier includes a VPLS destination address (V-DA), a VPLS source address (V-SA), a tunnel label (T-Label), and a virtual connection label (VC-Label). Of course, the VPLS identifier may also include other fields that, for simplicity, are not illustrated. In this case, transport module 210 not only adds the VPLS identifier to the packet, but also removes the customer VLAN identifier from the packet. Transport module 210 transmits this packet on link 228 to port 208.

Figure 6:
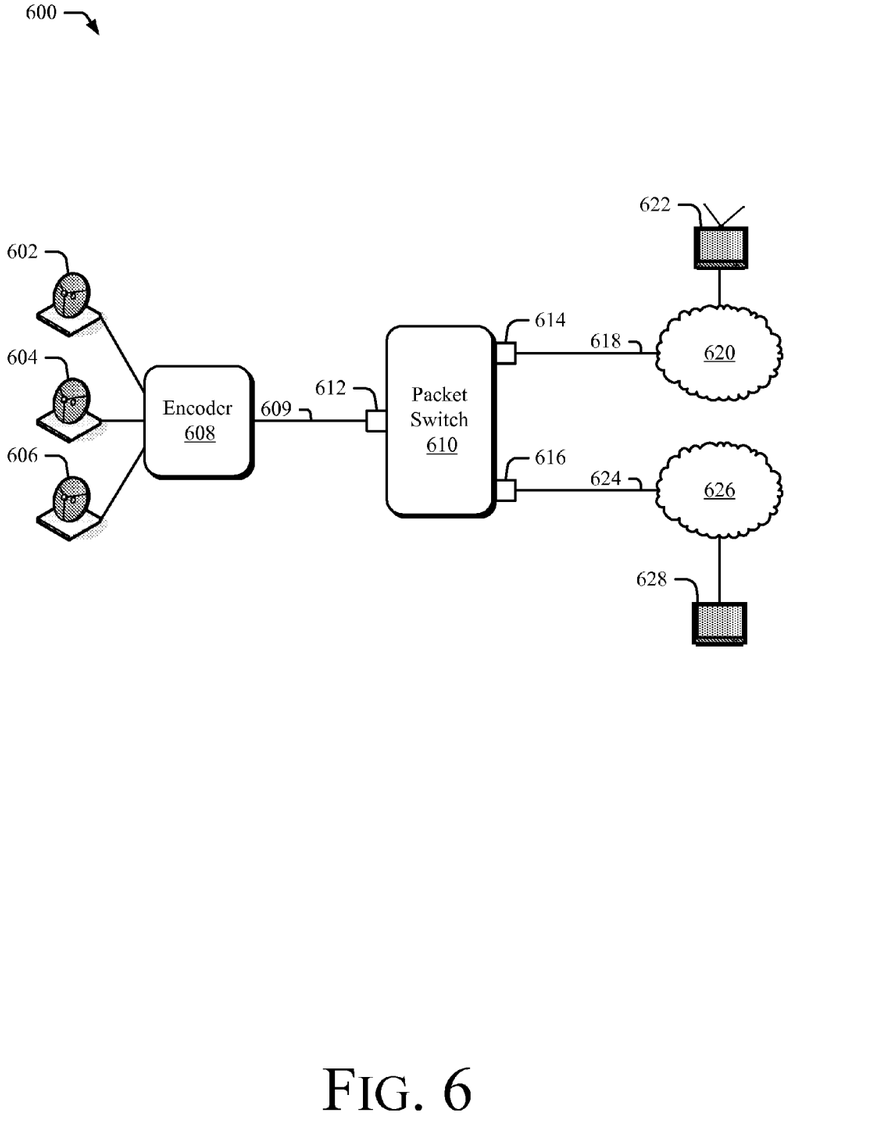
FIG. 6 illustrates an exemplary packet switch in an exemplary video distribution network.

Packet switch 200 may advantageously be used in distributing multicast packets such as multicast video packets. FIG. 6 illustrates a system 600 for distributing multicast video packets. The system includes three antennas 602, 604, 606 connected to an encoder 608; a packet switch 610 with three ports 612, 614, 616; two networks 620, 626; and two video monitors 622, 628. The packet switch may be the packet switch 200 of FIG. 2.

Encoder 608 receives modulated video signals from antennas 602, 604, and 606 and converts the video signals into streams of video packets. Each stream may relay the content of a television channel. The streams may be distributed over a packet network to a device capable of converting a stream into a video signal that may be displayed by a video monitor. For example, the device may be a set-top box and the video monitor may be a television. The streams may be distributed to a group of set-top boxes by multicasting the streams to the set-top boxes.

Set-top boxes that desire to receive a particular stream of multicast video packets corresponding with a particular television channel may associate themselves with a particular multicast group corresponding to the desired stream. The packet switch may multicast the desired stream to set-top boxes associated with the corresponding multicast group.

Encoder 608 sends streams of video packets to packet switch 610 via link 609. Packet switch 610 duplicates the streams and sends one of the duplicate streams out of each of the ports to a network to which a set-top box that has requested the stream is connected. For example, packet switch 610 may send one duplicate stream to network 620 on link 618 and another duplicate stream to network 626 on link 624.

The packet switch may determine which streams are to be sent out which of the ports by snooping Internet Group Management Protocol (IGMP) packets sent by set-top boxes to determine which streams have been requested by set-top boxes associated with a port. If the packet switch determines that a stream is to be sent out of multiple ports, the packet switch may duplicate the stream and send a duplicate out of each port. For example, if packet switch 610 determines that a video stream received on port 612 from encoder 608 should be forwarded to ports 614 and 616, packet switch 608 may duplicate the video stream and send one duplicate out port 614 and another duplicate out port 616.

Networks 620 and 626 may both expect that packets received by the network will include transport identifiers. Consequently, packet switch 610 may need to add a transport identifier to the packets of the video stream before forwarding the packets to network 614 and/or 616. In some cases, network 620 may expect a different transport identifier than network 626. For example, network 620 may expect packets it receives to have a VLAN identifier while network 626 may expect packets it receives to have an MPLS label.

To accommodate both networks, the packet switch may modify the duplicate streams so that one modified duplicate stream has a VLAN identifier as a transport identifier and the other modified duplicate stream has an MPLS label as a transport identifier.

According to one aspect of the invention, packet switch 610 receives a packet on a source port of packet switch 610. The source port may be a port that is connected directly or indirectly to a video encoder, for example, port 612 of packet switch 610. After forwarding the packet to a switching fabric of the packet switch, the packet switch creates a plurality of duplicates of the packet. The packet switch may create one duplicate for each port of the packet switch that requires the packet.

The packet switch then transmits one of the duplicates on each of a plurality of ports of the packet switch. Two or more of the transmitted duplicates have different transport identifiers. After the packet switch creates the duplicates, the packet switch may modify the duplicates so that two or more of the duplicates have different transport identifiers. According to one aspect of the invention, the packet switch creates the duplicate packets within the switching fabric portion of the packet switch.

For example, one of the duplicates may have a VLAN identifier with a value of 100 as a transport identifier and another of the duplicates may have a VLAN identifier with a value of 500 as a transport identifier. Of course, the duplicates may have different transport identifier formats as well. For example, one of the duplicates may have a VLAN identifier as a transport identifier and another of the duplicates may have at least one MPLS label as a transport identifier. Various aspects of the invention described herein enable such configurations.

In one embodiment of the packet, the packet may be an Ethernet packet that includes a layer-three multicast destination address, such as an Internet Protocol (IP) address, that is associated with a multicast group. In this case, the source port and the destination ports on which the duplicates are transmitted are also associated with the layer-three multicast group. Alternatively, the packet may include a layer-two multicast destination address associated with a layer-two multicast group. The destination ports may also be associated with a common virtual switch within the packet switch.

According to another aspect of the invention, the packet switch receives a packet that has a multicast destination address from a source port of a packet switch such as packet switch 200. The packet switch identifies a multicast group associated with the packet by, for example, inspecting fields of the packet to determine the multicast group.

The packet switch then forwards the packet to a switching fabric without duplicating the packet. The packet switch also notifies the switching fabric of the identified multicast group associated with the packet. Consequently, the switching fabric may create a duplicate of the packet for each of a set of destination ports associated with the multicast group.

The switching fabric may reference a configuration to determine which destination ports are associated with the multicast group. A transport module, such as transport module 210 of packet switch 200 then receives the duplicates from the switching fabric and modifies the duplicates so that two or more of the duplicates have different transport identifiers. The transport module may then forward one of the duplicates to each of the destination ports associated with the multicast group. The packet switch then transmits the duplicates on each of the destination ports associated with the multicast group.

According to another aspect of the invention, the packet switch may remove a transport identifier from the packet before forwarding the packet to the switching fabric. For example, the packet received from the encoder may include a VLAN identifier having a value of 1000. The packet switch may remove the VLAN identifier prior to forwarding the packet to the switching fabric. This may advantageously reduce the size of the packet and thereby reduce the amount of bandwidth consumed via the switching fabric in forwarding and duplicating the packet.

According to another aspect of the invention, as part of modifying the duplicates, the packet switch may determine the transport identifier to be added to a duplicate based on a virtual switch associated with the duplicate and based on the destination ports to which the duplicate is sent as was discussed above in relation to FIG. 5.

According to another aspect of the invention, the transport module may receive the duplicate packets from a plurality of interfaces of the switching fabric. The interfaces of the switching fabric may be interfaces 214, 216, 218, and 220 described above in relation to FIG. 2. As was described above, each of the interfaces is associated with one of the ports of the packet switch. For example, interface 214 of FIG. 2 is associated with port 202, interface 216 is associated with port 204, and so on.

Figure 7:
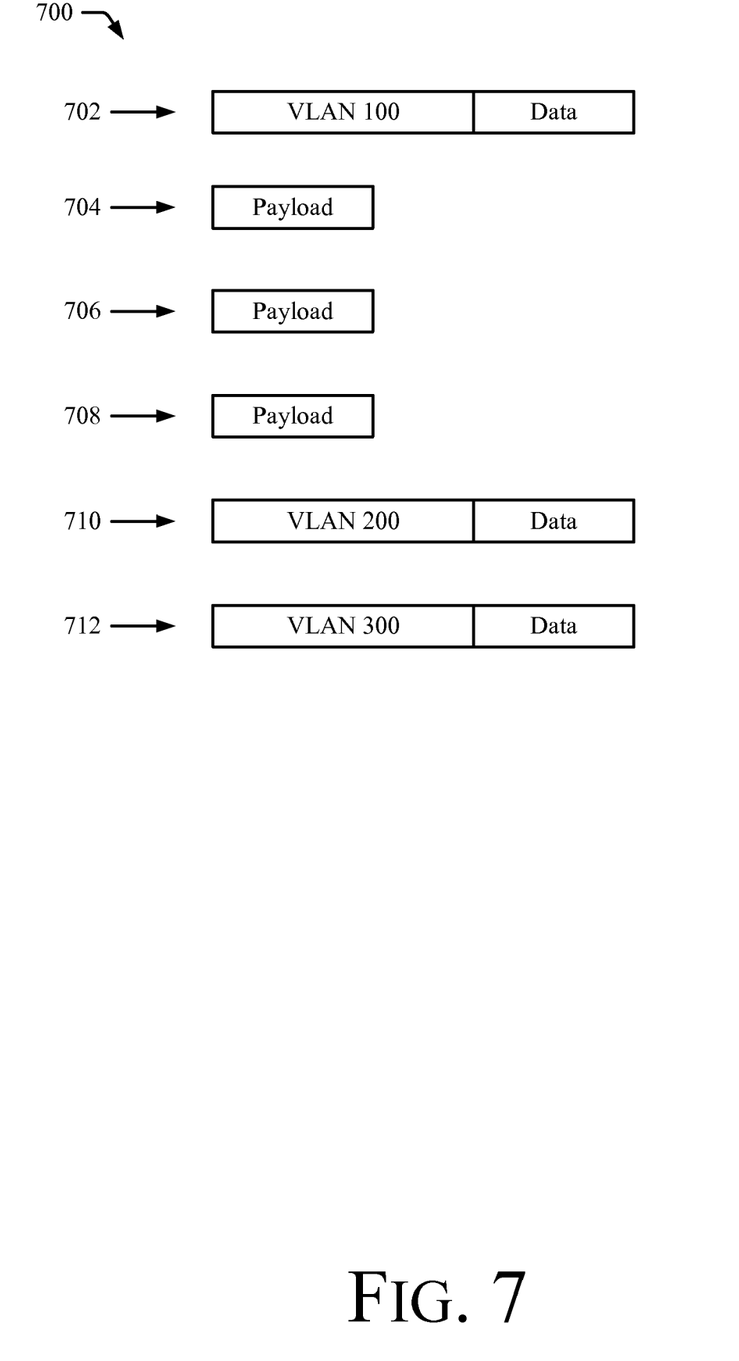
FIG. 7 illustrates exemplary data packets associated with the exemplary packet switch of FIG. 6.

FIG. 7 illustrates six exemplary data packets 700. The exemplary data packets illustrate the changing formats of a packet as it is received on port 202 of packet switch 200, processed by packet switch 202, and transmitted on ports 204 and 206 of packet switch 202. Ports 204 and 206 are associated with the same multicast group and are also part of the same virtual switch. In this example, the packet is not forwarded to port 208 because port 208 is not associated with the multicast group.

Exemplary data packet 702 represents a data packet received from an encoder on port 202 of the packet switch. Transport module 210 receives exemplary data packet 702 on link 222. Transport module 210 may assign the packet to a virtual switch based on the fields of the packet as was described above in relation to FIG. 3.

Exemplary data packet 704 illustrates the format of exemplary packet 702 after it has been modified by transport module 210. In this example, transport module 210 removes the transport identifier "VLAN 100" from the packet prior to forwarding the packet to interface 214 of switching fabric 212 on link 230.

Switching fabric 212 duplicates exemplary data packet 704 by creating a duplicate for ports that are associated with the multicast group other than the port on which the packet was received. Switching fabric 212 forwards the duplicate packets to transport module 210. Exemplary data packet 706 illustrates the format of exemplary packet 702 after it has been duplicated by switching fabric 212 and sent on link 232 to transport module 210. Exemplary data packet 708 illustrates the format of exemplary packet 702 after it has been duplicated by switching fabric 212 and sent on link 234 to transport module 210.

Note that exemplary data packets 706 and 708 are duplicates of each other. According to one aspect of the invention, the duplicates are identical. However, according to another aspect of the invention, the duplicates are not identical because they may have different headers appended to them by the switching fabric. In this case, the packets are identical except for their headers.

The header, as described above in relation to FIG. 2 may include a virtual switch identifier and a destination port to which the packet is to be forwarded. In this case, the packets are duplicates but the headers are not duplicates.

In some embodiments, neither the transport module nor the switching fabric appends a header to the packet. Instead, as described above in relation to FIG. 2, the transport module creates metadata associated with the packet and forwards the metadata to the switching fabric. The metadata may include information that would typically be included in the header.

Exemplary data packet 710 illustrates the format of exemplary packet 706 after has it has been modified by transport module 210 to include a transport identifier. In this case, the transport identifier is a VLAN identifier having a value of 200. Transport module 210 forwards exemplary data packet 710 on link 224 to port 204 of packet switch 200.

Exemplary data packet 712 illustrates the format of exemplary packet 708 after has it has been modified by transport module 210 to include a transport identifier. In this case, the transport identifier is a VLAN identifier having a value of 300. Transport module 210 forwards exemplary data packet 712 on link 226 to port 206 of packet switch 200. Consequently, ports 204 and 206 each transmit a packet having the same payload but having a different transport identifier.

This method of duplicating packets and appending different transport identifiers to the duplicate packets provides a cost-effective way of distributing multicast video streams without using expensive conventional multicast routers. The transport module enables this functionality by modifying packets at layer-two and is thus less expensive than powerful processing engines and large memories utilized by layer-three multicast routers.

Although the functionality of the packet switch has been described above in relation to multicast video packets, other multicast packets may also be processed by the packet switch.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet switch operating method comprising:
receiving a packet on a physical source port of a packet switch;
after forwarding the packet to a switching fabric of the packet switch, creating a plurality of duplicates of the packet;
modifying the duplicates so that two or more duplicates comprise different transport identifiers relative to one another but, are otherwise identical; and
transmitting one of the modified duplicates on each of a plurality of physical ports of the packet switch, wherein the two or more of the duplicates comprise the same destination address and the different transport identifiers of the two or more of the duplicates do not comprise the destination address.

2. The method of claim 1 wherein the creating of the plurality of duplicates of the packet comprises creating the plurality of duplicates of the packet within the switching fabric.

3. The method of claim 1 wherein the different transport identifiers comprise Virtual Local Area Network (VLAN) identifiers having different values.

4. The method of claim 1 wherein one of the different transport identifiers comprises a VLAN identifier and another one of the different transport identifiers comprises a provider bridging identifier.

5. The method of claim 1:
wherein the packet switch comprises a plurality of blades, the physical source port being located on one of the plurality of blades and one of the physical ports of the plurality being located on a different one of the plurality of blades; and
wherein the switching fabric comprises a plurality of silicon devices, two of the plurality of silicon devices being located on different blades of the plurality of blades.

6. The method of claim 1 wherein the packet is an Ethernet packet comprising a layer-three multicast destination address.

7. The method of claim 1 wherein the physical source port and the plurality of physical ports are associated with a common layer-three multicast group and a common virtual switch.

8. A packet switch comprising:
a source port;
plurality of ports other than the source port;
a switching fabric; and
processing circuitry coupled to the source port, the plurality of ports, and the switching fabric and configured to:
receive a packet via the source port;
forward the received packet to the switching fabric;
after forwarding the received packet to the switching fabric, create a plurality of duplicates of the packet;
modify the duplicates so that two or more duplicates comprise different transport identifiers relative to one another, but are otherwise identical; and
transmit one of the duplicates on each of a plurality of ports of the packet switch, wherein the two or more of the duplicates comprise the same destination address and the different transport identifiers of the two or more of the duplicates do not comprise the destination address.

9. The method of claim 1 wherein the transmitting comprises transmitting a first one of the two or more duplicates to a first network node that is physically distinct and remotely located from the packet switch and transmitting a second one of the two or more duplicates to a second network node that is physically distinct and remotely located from the packet switch, the first one of the two or more duplicates comprising a different transport identifier than the second one of the two or more duplicates.

10. The method of claim 1 wherein the destination address is an IP multicast destination address.

* * * * *